(12) United States Patent
Mekis

(10) Patent No.: US 7,881,575 B2
(45) Date of Patent: Feb. 1, 2011

(54) LOW-LOSS OPTICAL INTERCONNECT

(75) Inventor: Attila Mekis, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 12/362,154

(22) Filed: Jan. 29, 2009

(65) Prior Publication Data

US 2009/0196547 A1  Aug. 6, 2009

Related U.S. Application Data

(60) Provisional application No. 61/062,978, filed on Jan. 30, 2008.

(51) Int. Cl.
*G02B 6/26* (2006.01)
(52) U.S. Cl. .............. 385/50; 385/28; 385/29; 385/43
(58) Field of Classification Search .......... 385/28, 385/29, 43, 50
See application file for complete search history.

(56) References Cited

U.S. PATENT DOCUMENTS

| 7,010,208 B1 * | 3/2006 | Gunn et al. ............... 385/131 |
| 7,302,135 B2 * | 11/2007 | Melloni et al. ............. 385/28 |
| 2003/0174956 A1 * | 9/2003 | Viens .................... 385/43 |

* cited by examiner

*Primary Examiner*—Jerry T Rahll
(74) *Attorney, Agent, or Firm*—McAndrews, Held & Malloy, Ltd.

(57) ABSTRACT

A low-loss optical interconnect is disclosed and may include an optical interconnect system with narrow and wide waveguides joining optical devices. The system may also comprise mode converters and waveguide bends. The waveguides may be made of silicon. Other exemplary aspects of the invention may comprise a continuous optical bend, whose radius of curvature at its endpoints is infinity and at its internal points is finite. The bend may be made of silicon. The width of the bend may vary along the bend. The system may comprise narrow and wide waveguides and a continuous bend.

16 Claims, 7 Drawing Sheets

LOW-LOSS OPTICAL INTERCONNECT

CROSS-REFERENCE TO RELATED APPLICATIONS/INCORPORATION BY REFERENCE

This application makes reference to and claims priority to U.S. Provisional Application Ser. No. 61/062,978 filed on Jan. 30, 2008, which is hereby incorporated herein by reference in its entirety.

FEDERALLY SPONSORED RESEARCH OR DEVELOPMENT

[Not Applicable]

[MICROFICHE/COPYRIGHT REFERENCE]

[Not Applicable]

FIELD OF THE INVENTION

Certain embodiments of the invention relate to photonic integrated circuits. More specifically, certain embodiments of the invention relate to a low-loss optical interconnect in such circuits.

BACKGROUND OF THE INVENTION

Photonic integrated circuits (PICs) integrate many optical functions on a single chip. These circuits require a means of connecting the individual light processing elements inside the circuits to each other. Waveguides, whose operation is based on refractive index contrast, are typical elements that transfer light from one element to the other in optical circuits.

Waveguides that are narrow compared the wavelength of the light in the waveguide are typically used in PICs because they carry a single well-defined mode, a property that enables direct connection to optical signal processing and networking elements. Narrow waveguides can also be bent without incurring high optical losses, allowing flexibility in layout. However, narrow waveguides have typically high propagation losses due to the interaction of the optical mode with the waveguide surface. On the other hand, waveguides that are wide compared to the wavelength of the light in the waveguide have low propagation losses for the fundamental mode and are better suited to span larger distances across the chip containing the PIC. However, these waveguides cannot interface easily to other optical components, nor can they be bent with low optical loss due to mode conversion in the bent sections.

Furthermore, typical narrow waveguide bend designs have intrinsic mismatch losses due to the offset and asymmetry of the optical mode inside a bend. Such mismatch losses can be mitigated by physically offsetting the two waveguides in the plane of the bend but cannot be fully eliminated by traditional means in high index contrast systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A low-loss optical interconnect, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a low-loss optical interconnect. Exemplary aspects of the invention may comprise an optical interconnect system with narrow and wide waveguides joining optical devices. The system may also comprise mode converters and waveguide bends. The waveguides may comprise silicon. Other exemplary aspects of the invention may comprise a continuous optical bend, whose radius of curvature at its endpoints is infinity and at its internal points is finite. The bend may be made of silicon. The width of the bend may vary along the bend. The system may comprise narrow and wide waveguides and a continuous bend.

Figure 1A:
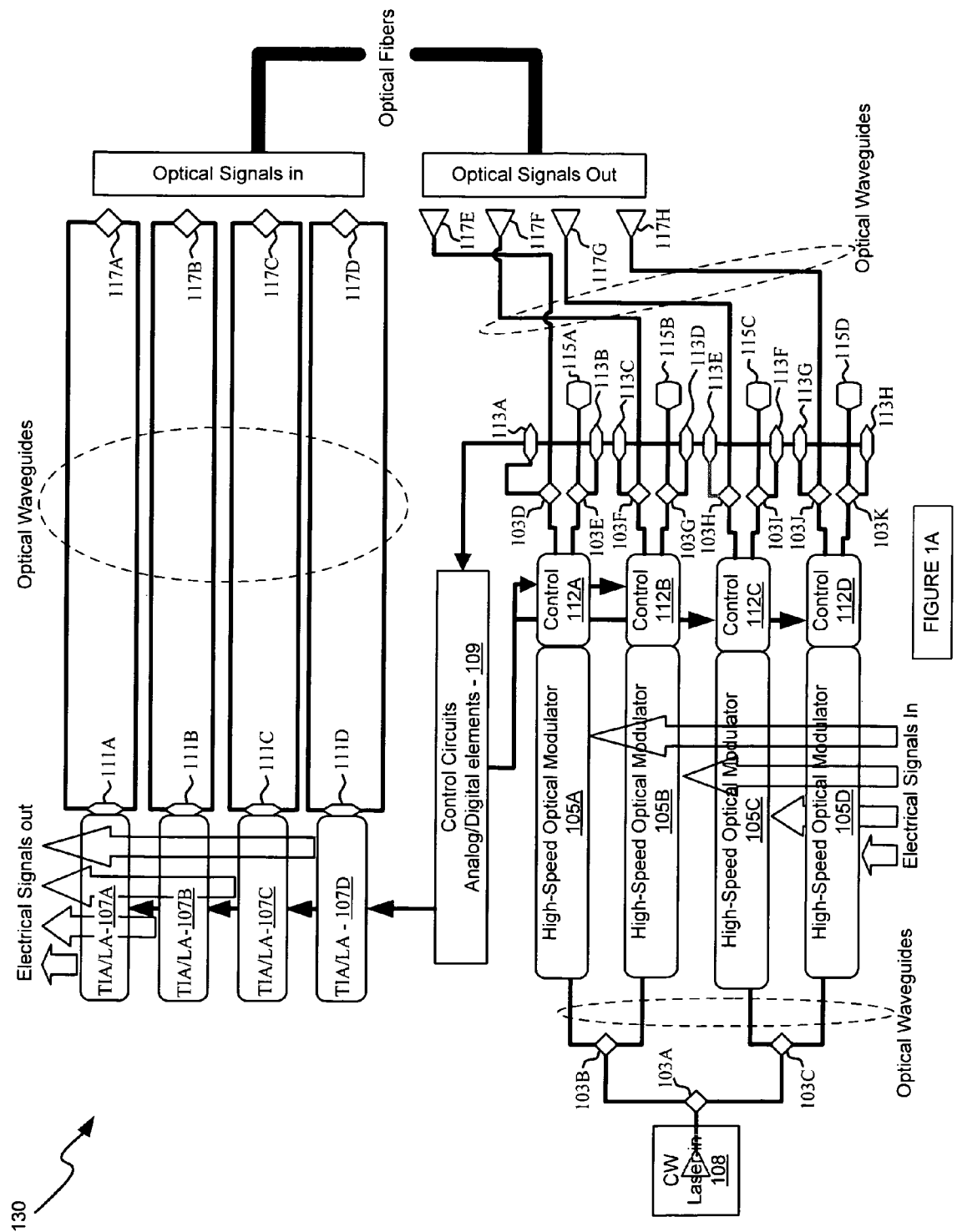
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107E, analog and digital control circuits 109, and control sections 112A-112D.

Optical signals are communicated between optical and optoelectronic devices via optical waveguides fabricated in the CMOS chip 130. Additionally, optical waveguides are indicated in FIG. 1A by the dashed ovals.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and may comprise polarization independent grating couplers. The grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D may then communicate electrical signals to other circuitry on the CMOS chip 130 and/or circuitry/devices off-chip.

The TIA/LAs 107A-107D may comprise narrowband, non-linear optoelectronic receiver circuitry. Accordingly, the narrowband receiver front-end may be followed by a non-return to zero (NRZ) level restorer circuit. This circuit limits the bandwidth of the optical receiver in order to decrease the integrated noise, thereby increasing the signal to noise ratio. An NRZ level restorer may be used to convert the resulting data pulses back into NRZ data.

The control sections 112A-112D comprise electronic circuitry that enable modulation of the CW laser signal received from the taps 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased.

Figure 1B:
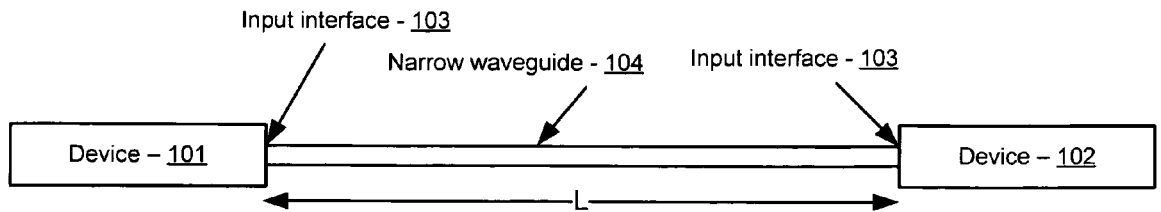
FIG. 1B is a block diagram of an exemplary optical system illustrating a traditional optical interconnect, in connection with an embodiment of the invention.

In an embodiment of the invention, the integration of all optical, electrical and optoelectronic devices required for a transceiver, along with a coupled laser source, enables the integration of multiple optoelectronic transceivers on a single chip. In an exemplary embodiment, the CMOS chip 130 comprises four optoelectronic transceivers with one optical source, and enables communication of optical signals vertically to and from the chip surface, thus enabling the use of CMOS processes, including a CMOS guard ring FIG. 1B is a block diagram of an exemplary optical system illustrating a traditional optical interconnect, in connection with an embodiment of the invention. Referring to FIG. 1B, there are shown two optical devices 101 and 102. The two optical devices may be identical or may differ and they may come from a group comprising light splitters/combiners, grating couplers, narrowband filters, light modulators, light receivers, multiplexers, and demultiplexers. The input interfaces 103 of the devices 101 and 102 are such that a narrow waveguide 104 can be joined to it without incurring high loss in the optical path. The two input interfaces 103 are oriented in the same plane facing each other, connected by a narrow waveguide 104. The narrow waveguide 104 has a width that is smaller than the wavelength of the light inside the waveguide material at the wavelength at which the devices 101 and 102 operate. The optical loss $L_1$ of the connection between the interfaces 103 is given by the expression $$L_1 = S_n L \qquad (1)$$

where $S_n$ is the loss of the narrow waveguide 104 per unit length and L is the length of the narrow waveguide 104.

Figure 1C:
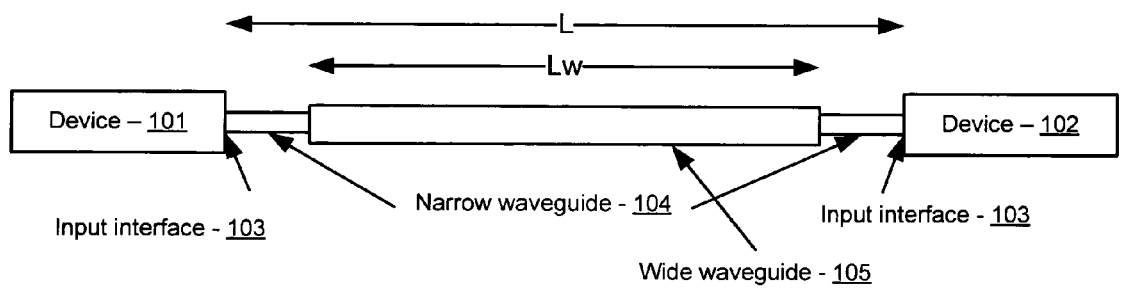
FIG. 1C is a block diagram of an exemplary optical system illustrating a low-loss optical interconnect, in accordance with an embodiment of the invention.

FIG. 1C is a block diagram of an exemplary optical system illustrating a low-loss optical interconnect, in accordance with an embodiment of the invention. Referring to FIG. 1C, there are shown two optical devices 101 and 102 with optical interfaces 103 facing each other. The optical interfaces 103 are connected by a low loss interconnect. The interconnect comprises narrow waveguides 104 and a wide waveguide 105. The loss $L_2$ of the optical interconnect is given by $$L_2 = S_n(L - L_w) + S_w L_w + 2S_i \qquad (2)$$

where $S_n$ is the loss of the narrow waveguide per unit length, $S_w$ is the loss of the wide waveguide per unit length for the fundamental mode, $S_i$ is the loss at the interface between the narrow waveguides 104 and the wide waveguide 105, L is the total length of the interconnect and $L_w$ is the length of the wide waveguide 105. Typically the loss of the narrow waveguide 104 is larger than the loss of the wide waveguide 105 ($S_n > S_w$) because the optical mode interacts less with the surface of the wide waveguide 105. The interface loss $S_i$ can be caused by, for instance, a large mode mismatch between the two waveguides of different widths. When comparing the optical loss of the two optical systems shown in FIG. 1B and in FIG. 1C, it can be shown that the loss of the interconnect system in FIG. 1C is lower (that is, $L_2 < L_1$) when the length $L_w$ is greater than a critical length $$L_c = 2S_i/(S_n - S_w) \qquad (3)$$

If the length of the wide waveguide 104 is chosen greater than this critical length, then the interconnect loss may be reduced. By using a wide waveguide 104 for interconnect lengths greater than $L_c$, in combination with the narrow waveguide 103, a low-loss interconnect may be configured between the optical devices 101 and 102. In this case the loss introduced by the presence of the interface between the two types of waveguides is smaller than the decrease in loss due to the lower loss of the wide waveguide 104. If $L_c$ can be made smaller by reducing $S_i$ or $S_w$, this design can be applied even more widely in the optical circuit.

Figure 1D:
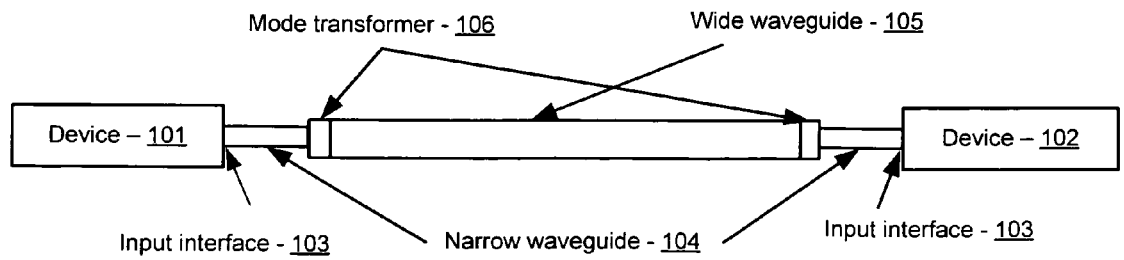
FIG. 1D is a block diagram of an exemplary optical system illustrating a low-loss optical interconnect with mode converters, in accordance with an embodiment of the invention.

FIG. 1D is a block diagram of an exemplary optical system illustrating a low-loss optical interconnect with mode converters, in accordance with an embodiment of the invention. Referring to FIG. 1D, there are shown two optical devices 101 and 102, connected by a low loss interconnect. The interconnect comprises narrow waveguides 103 and a wide waveguide 104 as well as mode converters 105. The mode converter 105 is introduced at the interface between the narrow waveguide 102 and the wide waveguide 103 in order to reduce the interface loss $S_i$. This mode converter may be a taper whose width varies continuously between the width of the narrow waveguide 103 and the width of the wide waveguide 104. With a lower loss $S_j$, the critical length $L_c$ is further reduced.

Figure 2:
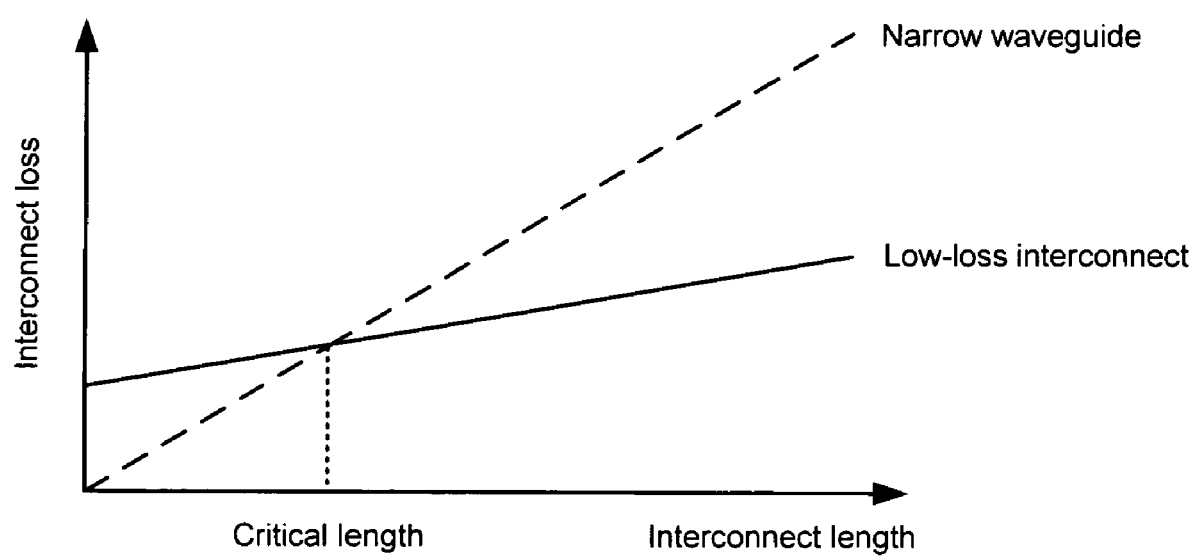
FIG. 2 is a graph showing the interconnect loss as a function of interconnect length, in accordance with an embodiment of the invention.

FIG. 2 is a graph showing the interconnect loss as a function of interconnect length. Referring to FIG. 2, there is shown a comparison of the optical loss between two interconnect configurations: one in which the connection between two devices is made solely with a narrow waveguide 103 (as in FIG. 1B), shown with a dashed line and one in which the connection is made with a low-loss interconnect, comprising both narrow waveguide 103 and wide waveguide 104, shown with a solid line. It is apparent from the graph that for interconnect lengths larger than the critical length $L_c$, where the two lines cross, it is more appropriate to use a low-loss interconnect configuration.

Figure 3:
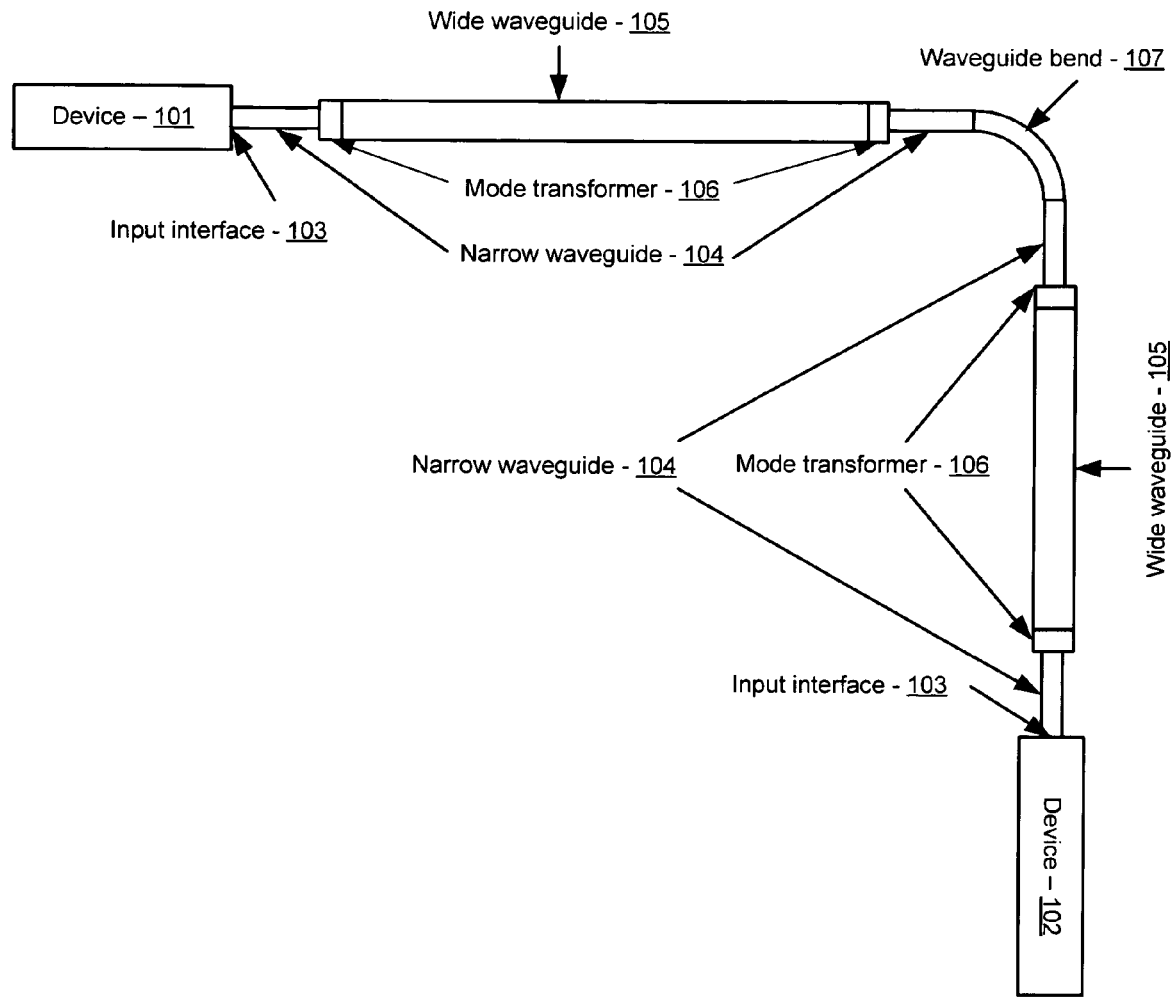
FIG. 3 is a block diagram of an exemplary optical system illustrating a low-loss interconnect between optical devices with non-parallel interfaces, in accordance with an embodiment of the invention.

FIG. 3 is a block diagram of an exemplary optical system illustrating a low-loss interconnect between optical devices with non-parallel interfaces, in accordance with an embodiment of the invention. Referring to FIG. 3, there is shown two optical devices 101 and 102. The input interfaces 103 of the two devices 101 and 102 are oriented at right angles to each other. The low-loss interconnect between the two devices comprises narrow waveguides 103, wide waveguides 104, mode converters 105, and a waveguide bend 106. The waveguide bend 106 is introduced to turn the light by 90 degrees in the plane of the devices. Even though the wide waveguide 105 has lower loss than the narrow waveguide 104 for straight connections, as in FIG. 1D, it cannot typically be bent without inducing mode conversion. The wide waveguide may support several modes, and mode conversion in the bend effectively results in high optical losses in the path between devices 101 and 102. Therefore the waveguide bend in this exemplary system is a bent version of the narrow waveguide 104. To insert this bend as part of the interconnect, additional narrow waveguide sections and mode converters adjacent to the bend may be utilized. Using the bend in this configuration enables low-loss interconnections between devices 101 and 102 with interfaces 103 that are not parallel.

This invention is not restricted to the exemplary systems presented above but the same principle can also be applied to interconnecting devices whose input interfaces are at arbitrary relative locations and angles to each other. The turning angle of the bend used in an arbitrary configuration can also be different from the 90 degrees in the exemplary system in FIG. 3.

Figure 4A:
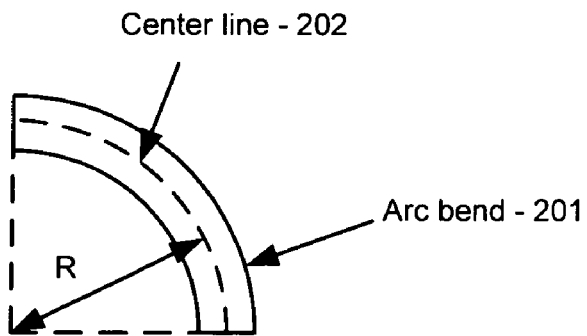
FIG. 4A is a block diagram of an exemplary arc bend, in connection with an embodiment of the invention.

FIG. 4A is a block diagram of an exemplary arc bend, in connection with an embodiment of the invention. The arc bend may be designed to change the direction of light propagation in the waveguide. Referring to FIG. 4A, there is shown an arc bend 201 comprising a 90 degree turning angle. The curve of the arc bend 201 is defined by its center line 202 and can be written in polar coordinates as $$r(\phi) = R \quad (4)$$

The radius of curvature R at every point along the arc bend 201 is defined as $$R = \frac{\left[r^2 + \left(\frac{dr}{d\phi}\right)^2\right]^{3/2}}{r^2 + 2\left(\frac{dr}{d\phi}\right)^2 - r\frac{d^2r}{d\phi^2}} \quad (5)$$

The arc bend 201 therefore has a finite constant radius of curvature R.

Figure 4B:
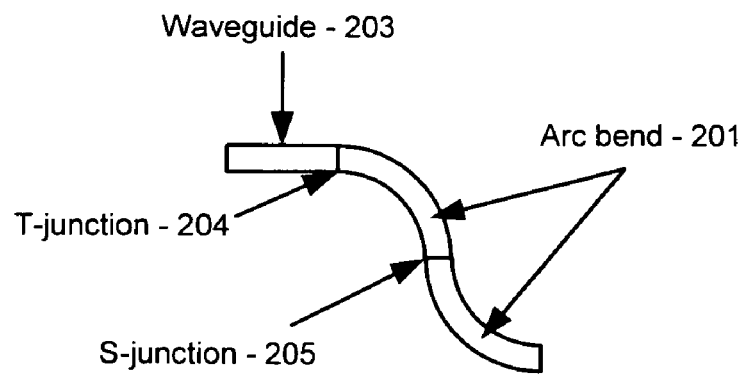
FIG. 4B is a block diagram of an exemplary optical system illustrating optical loss at junctions in systems with an arc bend, in connection with an embodiment of the invention.

FIG. 4B is a block diagram of an exemplary optical system illustrating optical loss at junctions in systems with an arc bend, in connection with an embodiment of the invention. The system is designed to change the direction of light propagation in the waveguide in order to connect two optical devices. Referring to FIG. 4B, the system comprises two arc bends 201 and a waveguide 203. Because the arc bend 201 has a finite and constant radius of curvature, when it is interfaced to a straight waveguide, or to another arc bend, the light propagation through the interface junction suffers a loss.

There are two types of junctions in the system depicted in FIG. 4B where optical loss is incurred. Referring to FIG. 4B, at the T-junction 204 between a straight waveguide 203 and the arc bend 201, the radius of curvature changes in a discontinuous fashion, as it goes from infinity in the waveguide to R in the arc bend. Similarly, referring to FIG. 4B, at the S-junction 205 between the two arc bends 201 curving in opposite directions, the radius of curvature changes discontinuously from +R to −R. Therefore, at the S-junction 205, there are also optical transition losses. The transition losses can be decreased by increasing the radius of curvature R, but this is at the expense of additional real estate on a photonics chip as well as additional propagation losses due to a much larger overall area of the resulting optical circuit.

Figure 5A:
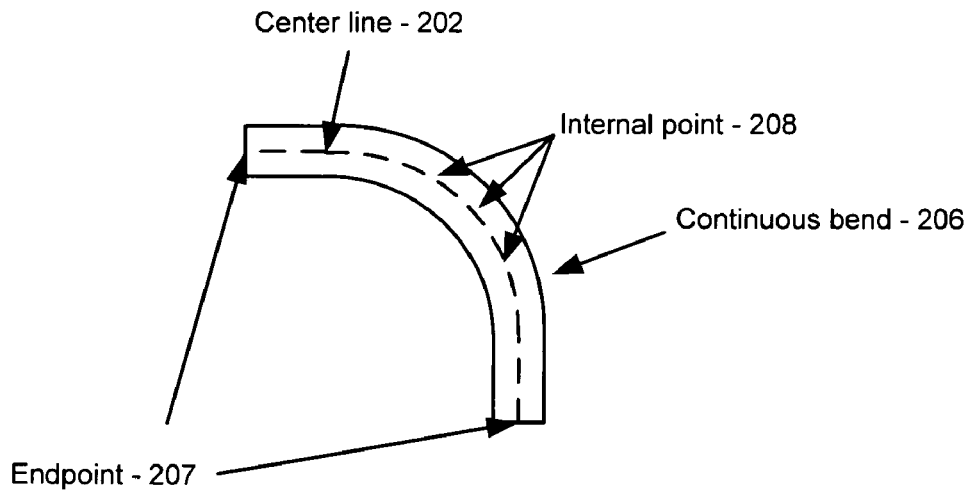
FIG. 5A is a block diagram of an exemplary continuous bend device, in accordance with an embodiment of the invention.

FIG. 5A is a block diagram of an exemplary continuous bend device, in accordance with an embodiment of the invention. Referring to FIG. 5A, there is shown a continuous bend 206 with a 90 degree turning radius. The bend is defined by its center line 202. The endpoints 207 of the bend are the locations where the bend interfaces with waveguides or other bends or optical devices. The internal points 208 comprise points along the center line 202 that are not the endpoints. The continuous bend 206 differs from an arc bend 201 in that its center line 202 is described by the equation $$r(\phi) = R\left(1 + \frac{1}{8}\sin^2 2\phi - \frac{C}{24}\sin^3 2\phi\right) \quad (6)$$

In this equation, the constant C can be selected arbitrarily. The radius of curvature of the continuous bend 206 as a function of angle is not a constant but changes as a function of the angle $\phi$. In fact, the radius of curvature is infinite at the endpoints 207 and is finite at the internal points 208.

Figure 5B:
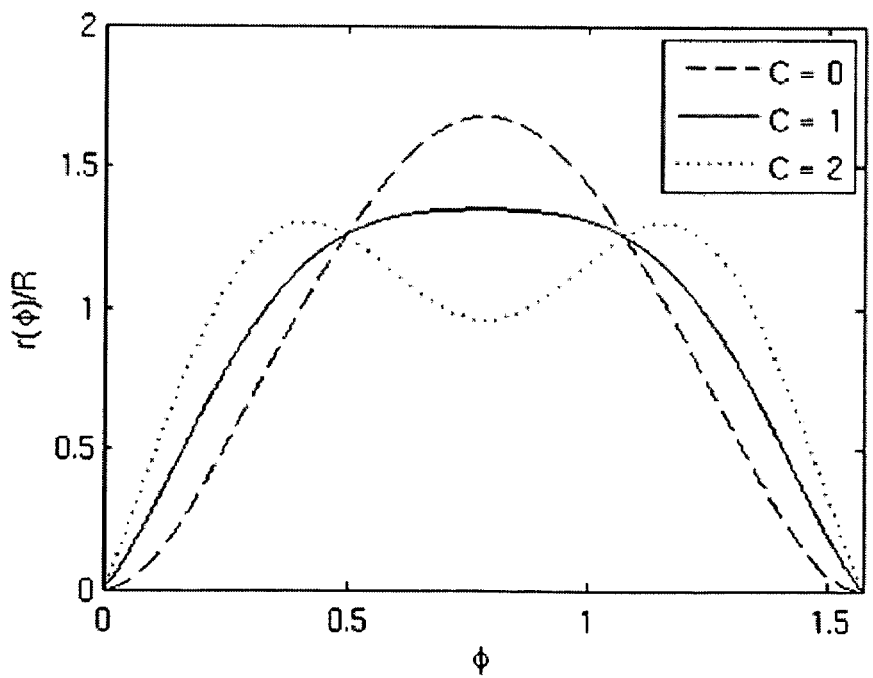
FIG. 5B is a graph of the inverse of the computed radius of curvature of the continuous bend 205 as a function of angle $\phi$, in accordance with an embodiment of the invention.

FIG. 5B is a graph of the inverse of the computed radius of curvature of the continuous bend 205 as a function of angle $\phi$. The three different curves represent the radius of curvature (also known as the curvature) for three different values of the constant C. For C=0 and C=1, the curvature is zero at the endpoints and increases monotonically to the middle of the bend, then decreases monotonically to the other endpoint. For C=2, the growth and decrease of the curvature is non-monotonic on the two sides of the middle of the bend. For all values of the constant C, the radius of curvature is infinite at the endpoints. With reference to FIG. 4B, if a continuous bend 206 replaces the arc bend 201, this property of the continuous bend eliminates transition losses at the T-junctions 204 and S-junctions 205 because now there is no discontinuous change in the radius of curvature at either of these junctions. This difference between the losses of arc bends and continuous bends has been experimentally demonstrated.

The continuous bend design is not restricted to the particular embodiment presented here but the same principle can also be applied to designing bends with arbitrary equations in polar coordinates whose radius of curvature varies smoothly from infinity at the endpoints of the bend to a finite value inside the bend.

The continuous bend design is not restricted to the particular embodiment presented here but the same principle can also be applied to designing bends with arbitrary turning angles.

Figure 6:
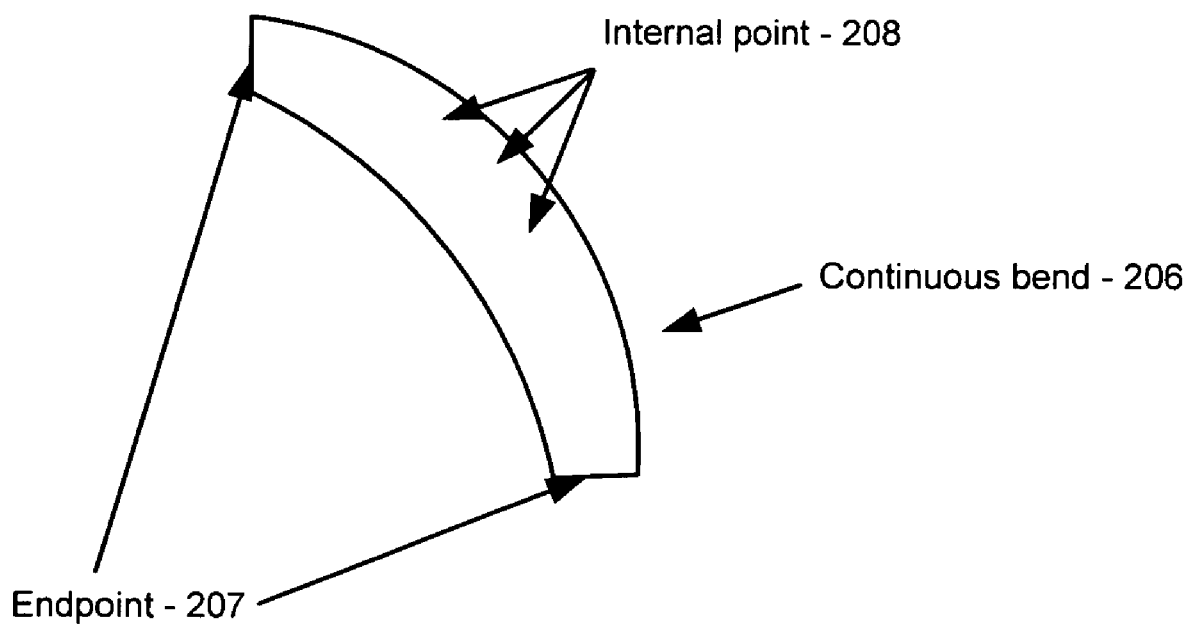
FIG. 6 is a block diagram of an exemplary continuous bend device with a varying width, in accordance with an embodiment of the invention.

FIG. 6 is a block diagram of an exemplary continuous bend device with a varying width, in accordance with an embodiment of the invention. Referring to FIG. 6, there is shown a continuous bend 206 with endpoints 207 and internal points 208. The width of the continuous bend is not constant in this case but varies along the bend. The width may be smaller near the end points and larger near the internal points. It is possible to select the width of the bend in such a way that the width is small where the radius of curvature is large and the width is large where the radius of curvature is small. As a wider waveguide typically has a smaller cutoff radius, this allows reducing potential bending losses near the points with the smallest radii of curvature and further enables smaller optical circuits.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for communicating optical signals, the system comprising:
    a plurality of optical devices on a CMOS chip, each of said optical devices comprising at least one optical interface, wherein said plurality of optical devices are functional near an operating wavelength of light;
    an optical interconnect on said CMOS chip and connecting said plurality of optical devices and being operable to communicate signals between or among said optical devices at a desired wavelength;
    said optical interconnect comprising one or more narrow waveguides comprising a first width that is smaller than said operating wavelength of light inside said narrow waveguides; and
    one or more wide waveguides comprising a second width that is larger than said operating wavelength of light inside said wide waveguides.

2. The system according to claim 1, wherein said optical interconnect comprises at least one mode converter joining said one or more narrow waveguides and said one or more wide waveguides.

3. The system according to claim 1 wherein said optical interconnect comprises at least one waveguide bend.

4. The system according to claim 1, wherein said one or more narrow waveguides and said one or more wide waveguides comprise silicon.

5. A system for communicating optical signals, the system comprising:
    optical interconnects on a CMOS chip comprising a plurality of optical waveguides operable to communicate signals between optical devices on said CMOS chip at a desired wavelength;
    said plurality of optical waveguides comprise one or more wide waveguides with a width that is wider than said desired wavelength and one or more narrow waveguides with a width that is narrower than said desired wavelength;
    said one or more narrow waveguides are placed adjacent to said one or more wide waveguides to couple said signals between said narrow and said wide waveguides; and
    wherein one or more of said narrow waveguides is curved into an optical bend following a center line tracing a path between two narrow waveguides configured at a nonzero angle from each other.

6. The system according to claim 5, wherein said center line is described by $$r(\phi) = R\left(1 + \frac{1}{8}\sin^2 2\phi - \frac{C}{24}\sin^3 2\phi\right).$$

7. The system according to claim 5, wherein the width of said one or more narrow waveguides curved into a optical bend comprises a variable width.

8. The system according to claim 5, wherein said plurality of optical waveguides comprise silicon.

9. The system according to claim 5, wherein said optical interconnects comprise at least one mode converter joining said one or more narrow waveguides and said one or more wide waveguides.

10. The system according to claim 5, wherein said center line comprises two endpoints and a plurality of internal points.

11. The system according to claim 10, wherein said center line comprises a radius of curvature that is infinite at said endpoints and finite at said plurality of internal points.

12. The system according to claim 5, wherein said optical devices comprise one or more of: light splitters, light combiners, grating couplers, narrowband filters, light modulators, light receivers, multiplexers, and demultiplexers.

13. The system according to claim 5, wherein said optical interconnect comprises an S junction.

14. The system according to claim 5, wherein said optical interconnect comprises a T-junction.

15. The system according to claim 5, wherein said optical bend comprises a plurality of arc bends.

16. The system according to claim 5, wherein said optical bend comprises a continuous bend.

* * * * *